(12) United States Patent
Xie (10) Patent No.: US 7,923,160 B2
(45) Date of Patent: Apr. 12, 2011

(54) METHOD FOR ACTIVATING SOLID POLYMER FUEL CELL

(75) Inventor: Gang Xie, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 1134 days.

(21) Appl. No.: 10/556,942

(22) PCT Filed: May 19, 2004

(86) PCT No.: PCT/JP2004/007149
§ 371 (c)(1),
(2), (4) Date: Nov. 16, 2005

(87) PCT Pub. No.: WO2004/105168
PCT Pub. Date: Dec. 2, 2004

(65) Prior Publication Data
US 2007/0009773 A1    Jan. 11, 2007

(30) Foreign Application Priority Data

May 21, 2003 (JP) ................................. 2003-143126

(51) Int. Cl.
*H01M 8/10* (2006.01)
*H01M 8/04* (2006.01)
(52) U.S. Cl. ........................................ 429/429; 429/492
(58) Field of Classification Search .................. None
See application file for complete search history.

(56) References Cited

U.S. PATENT DOCUMENTS 6,187,464 B1 * 2/2001 Yasumoto et al. ............ 429/413

FOREIGN PATENT DOCUMENTS

| JP | 55-19713 | 2/1980 |
|---|---|---|
| JP | 60-62063 | 4/1985 |
| JP | 2-60057 | 2/1990 |
| JP | 06-196187 | 7/1994 |
| JP | 6-333586 | 12/1994 |
| JP | 11-040178 | 2/1999 |
| JP | 11-079702 | 3/1999 |
| JP | 11-219715 | 8/1999 |
| JP | 2000-003718 | 1/2000 |
| JP | 2000-260453 | 9/2000 |
| JP | 2000-260455 | 9/2000 |
| JP | 2000-285927 | 10/2000 |
| JP | 2002-93448 | * 3/2002 |
| JP | 2002-141090 | 5/2002 |
| JP | 2003-123812 | 4/2003 |
| WO | WO 01/99218 A1 | 12/2001 |

* cited by examiner

*Primary Examiner* — John S Maples
(74) *Attorney, Agent, or Firm* — Oblon, Spivak, McClelland, Maier & Neustadt, L.L.P.

(57) ABSTRACT

By using a fuel cell having a membrane electrode assembly having and electrolyte membrane 100 formed by a polymer electrolyte membrane, and an anode 101 and a cathode 102 carrying a catalytic metal and sandwiching electrolyte membrane 100. The anode 101 and the cathode 102 are in electrical connection, and an activation treatment is carried out for opening an active site of catalytic metal of the cathode 102. This provides an activation method of a polymer electrolyte fuel cell which is advantageous to activation and raises cell voltage.

7 Claims, 9 Drawing Sheets

METHOD FOR ACTIVATING SOLID POLYMER FUEL CELL

This application is a 371 of PCT/JP04/07149, filed 19 May 2004 which claims priority from Japanese application 2003-143126, filed 21 May 2003.

TECHNICAL FIELD

The present invention relates to an activation method of a polymer electrolyte fuel cell by activating a fuel cell to raise cell voltage.

BACKGROUND ART

Conventionally, before a fuel cell is put into normal operation, there has been carried out a method in which the current with higher current density than the predetermined current density is passed to raise an output of the fuel cell, namely—pre-running. The effect of raising unit voltage can be obviously achieved when pure oxygen gas for working as an oxidant is supplied to a cathode, and when pre-running is carried out with the current density as much as possible, and the duration as long as possible.

However, the above-mentioned pre-running method is operationally complicated and time-consuming. Besides, as the heavy current running is needed, it causes flooding and massive heat, both of which may damage an electrolyte membrane. The so-called flooding refers to the phenomenon of the blockage of the cathode flow way by the water generated on the cathode. Due to the existence of such an unfavorable factor, the use of the above-mentioned method can hardly obtain an inherent capacity of the fuel cell itself effectively.

Patent Literature No. 1 discloses the activation technique of water electrolysis. This technique pays attention to the fact that in a fuel cell having an ion exchange membrane formed by a polymer electrolyte membrane, and a unit cell including an anode and a cathode for sandwiching the ion exchange membrane, and separators, the fuel cell is activated by increasing water content of the ion exchange membrane. In this technique, while the humidified gas is supplied to the cell, 1.3 v or more of electrolytic voltage is applied to the cell for water electrolysis. According to Patent Literature No. 1, water in an electrolyte membrane is compulsively decomposed into hydrogen and oxygen by the electrolysis, and in accordance with this, the concentration gradient of water molecules in the electrolyte membrane increases, and due to this, the water diffusion speed in the electrolyte membrane increases. As a result, water in the humidified gas flows to the electrolyte membrane to rapidly increase the water content.

Patent Literature No. 2 discloses the technique of restoring the degradation of a fuel cell. This technique pays attention to the fact that when metal ions such as iron, nickel, and the like are trapped into a high polymer electrolyte membrane, the ionic conductivity of the high polymer electrolyte membrane decreases and the power generation performance is weakened. In this technique, when a fuel cell is degraded, a fluid for restoring degradation which contains a reductant for restoring degradation (hydrazine or hydrazine salt) with stronger reducing power than that of hydrogen is brought into contact with the high polymer electrolyte membrane, so as to restore the degradation of the power generation performance of the fuel cell, whose degradation is caused by the metal ions adhered to the high polymer electrolyte membrane. According to Patent Literature No. 2, the metal ions such as iron, nickel and the like, which are trapped into the high polymer electrolyte membrane, which are reduced by the reductant for restoring degradation with stronger reducing power, and which is precipitated as metals. Thus, the metal ions are removed, and the power generation performance is enhanced.

In addition, Patent Literature No. 3 discloses the technique of activating a high polymer electrolyte membrane fuel cell, in which modules of the high polymer electrolyte membrane of a fuel cell is boiled in deionized water or mild acid water (such as hydrogen peroxide water). Besides, Patent Literature No. 3 discloses the technique of activating a high polymer electrolyte membrane fuel cell, in which alcohol is supplied to a gas supply way of the high polymer electrolyte membrane fuel cell to adapt an electrode diffusion layer to alcohol. Patent Literature No. 3 also discloses the technique of activating a high polymer electrolyte membrane fuel cell, in which the power generation of modules of the high polymer electrolyte membrane fuel cell is carried out with oxygen utilization rate of 50% or more, and the average cell voltage is kept to be 0.3 v or less.

(Patent Literature No. 1: Japanese Unexamined Patent Publication (KOKAI) No. 6-196, 187)

(Patent Literature No. 2: Japanese Unexamined Patent Publication (KOKAI) No. 2000-260,453)

(Patent Literature No. 3: Japanese Unexamined Patent Publication (KOKAI) No. 2000-3718)

However, according to the above-mentioned patent literatures 1-3, procedures are complicated, and time-consuming, and besides, flooding and massive heat caused by the heavy current running, may damage the electrolyte membrane. Since these defects exist, in the above-mentioned method, it is not necessarily clear that an inherent capacity of the fuel cell itself is obtained.

The present invention is made, taking account of the above-mentioned circumstances. An object of the present invention is to provide an activation method of a polymer electrolyte fuel cell which is advantageous to activation and raises cell voltage.

DISCLOSURE OF THE INVENTION (1) The present inventor has progressed analytical study on activity of a fuel cell by an electrochemical AC (alternating current) impedance method by using an impedance analyzer which is called as a frequency responding analytical device and a polymer electrolyte fuel cell. Here, the fuel cell has membrane electrode assemblies which are formed in multi-layered and each of which has an electrolyte membrane formed by a polymer electrolyte membrane, and an anode and a cathode carrying a catalytic metal to sandwich the electrolyte membrane. The electrochemical AC impedance method is a model test which is carried out by an equivalent circuit in which an electrochemical reaction is substituted with an electrical circuit.

Figure 1:
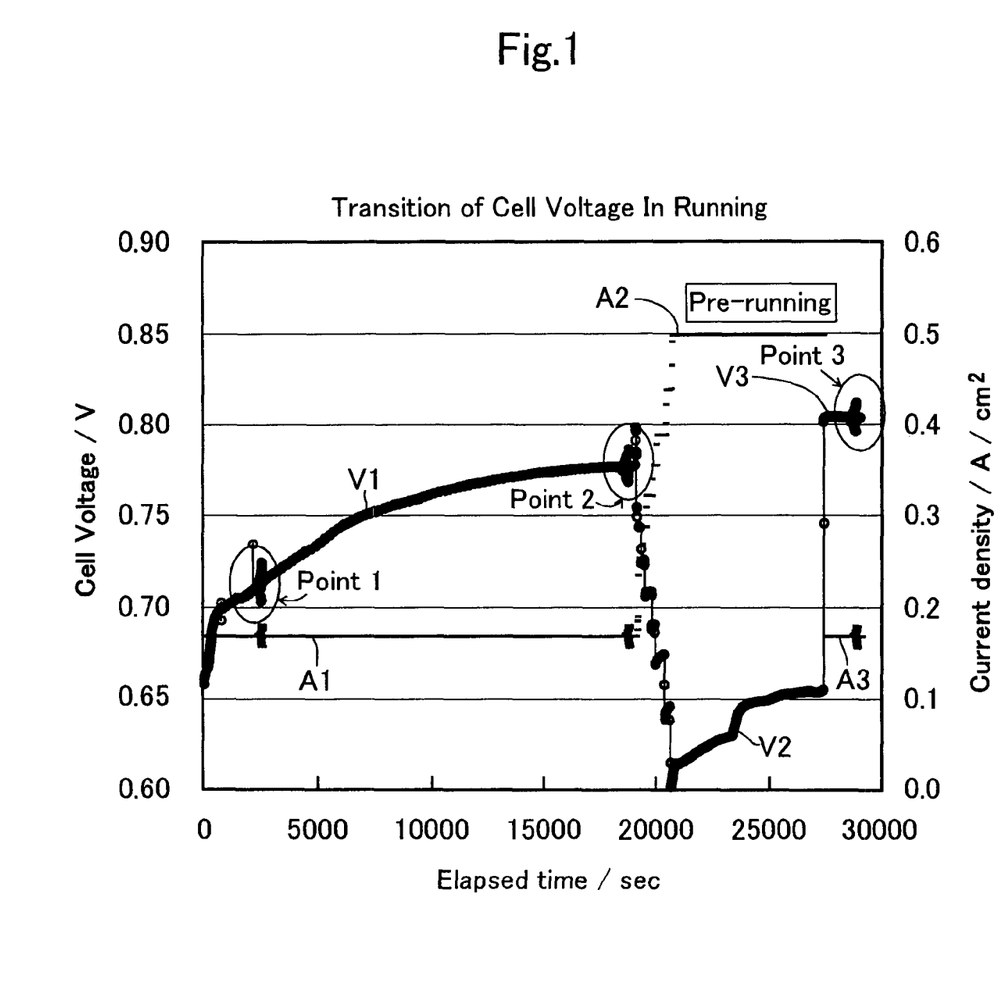
FIG. 1 is the curve diagram indicating the transition of cell voltage and current density before, in, and after pre-running.

The following shows typical Examples of making analysis which uses AC impedance method in the demonstration test. In this case, pure hydrogen gas (pressure: normal pressure) is supplied to the anode, and air (pressure: normal pressure) is supplied to the cathode. FIG. 1 indicates the relation among the time, the cell voltage and the current density when the power generation running of a fuel cell starts, and pre-running which is conventionally carried out by the present inventor. In FIG. 1, the characteristic lines V1, V2 and V3 indicate the cell voltage and the characteristic lines A1, A2 and A3 indicate the current density. The characteristic line V1 indicates the voltage characteristic from starting the power generation running of the fuel cell to starting the pre-running. The characteristic line A1 indicates the current characteristic from starting generation running of the fuel cell to starting the pre-running. The characteristic line V2 indicates the voltage characteristic during the pre-running. The characteristic line A2 indicates the current characteristic during the pre-running. In this pre-running, as illustrated in the characteristic line A2, the heavy current, having a current density of 0.5 A/cm$^2$, flows. The characteristic line V3 indicates the voltage characteristic after the pre-running. The characteristic line A3 indicates the current characteristic after the pre-running.

As shown in the characteristic line V1 of FIG. 1, the cell voltage gradually increases in accordance with starting of the power generation running of the fuel cell. When the cell voltage increases to a certain saturated state (point 2), the conventional pre-running begins. In the pre-running, a current density of heavy current (0.5 A/cm$^2$) is adopted, as shown in the characteristic line A2. At this time, the unit voltage descends to about 0.60 v, as shown in the characteristic line V2.

As the pre-running progresses, as shown in the characteristic line V2, the unit voltage begins to increase gradually from around 0.60 v. When the conventional pre-running is finished, as shown in the characteristic line V3, the cell voltage can be restored and increased higher than that of just before the pre-running, thereby achieving the activation effect. Thus, it is apparent that making lower contemporary of the cell voltage is effective for activating the fuel cell.

Figure 2:
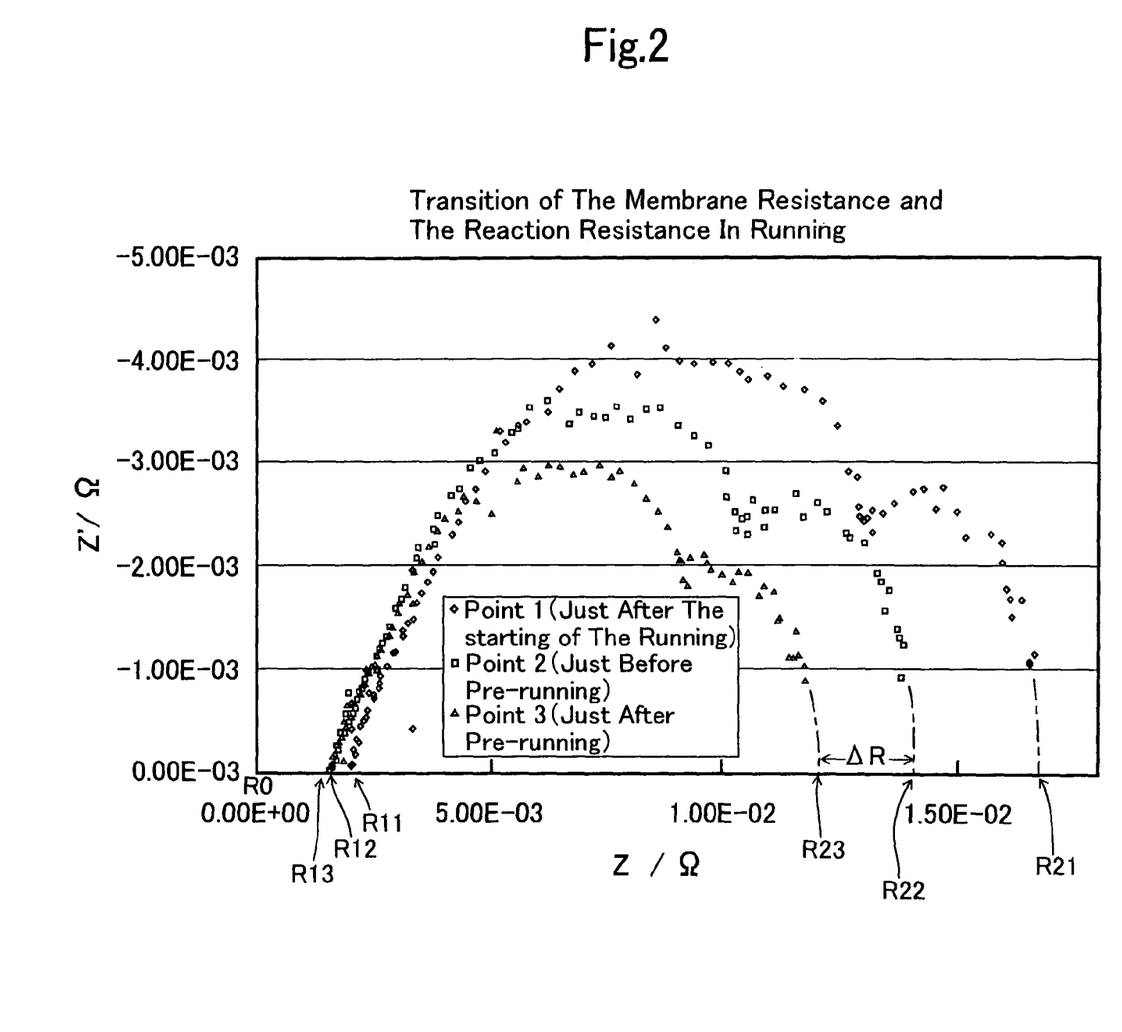
FIG. 2 is the curve diagram of the analytical result with AC impedance method, and shows the transition of the electrolyte membrane resistance and the electrode reaction resistance before, in, and after pre-running.

In FIG. 1, point 1 indicates the condition after the starting of the power generation running of the fuel cell, point 2 indicates the condition just before the pre-running of the fuel cell, and point 3 indicates the condition just after the pre-running of the fuel cell. The present inventor analyzes on points 1, 2 and 3 by an electrochemical AC impedance method. FIG. 2 indicates the analytical result (Cole-Cole Plot) by the AC impedance method, which is indicated as the complex plane. The electrochemical impedance Z is expressed as the complex quantity containing a real number Re and an imaginary number Im in the following formula (1).

$$Z(\text{impedance}) = R + j\,Im \qquad (1)$$

The horizontal axis of FIG. 2 indicates the real component of impedance, and the vertical axis of FIG. 2 indicates the imaginary component of impedance. The "5.00E-03" on the horizontal axis indicates $5.00 \times 10^{-3}$; the "-5.00E-03" on the longitudinal axis indicates $-5.00 \times 10^{-3}$. As shown in FIG. 2, in point 1 just after the pre-running of the fuel cell, the cell resistance including the resistance of the electrolyte membrane is equivalent to $R_{11}-R_0$; the resistance of the electrode reaction is equivalent to $R_{21}-R_{11}$; the resistance of the electrode reaction is relatively higher. As shown in FIG. 2, in point 2, just before the pre-running of the fuel cell, the cell resistance is equivalent to $R_{12}-R_0$, the resistance of the electrode reaction is equivalent to $R_{22}-R_{12}$, the resistance of the electrode reaction is lower than that in point 1, just after the pre-running. It can be inferred that the water content of the membrane increases gradually after the pre-running begins. In addition, as shown in FIG. 2, in point 3, just after the pre-running of the fuel cell, the cell resistance is equivalent to $R_{13}-R_0$, and the resistance of the electrode reaction is equivalent to $R_{23}-R_{13}$, and the cell resistance almost remains unchanged in comparison with point 2. However, the resistance of the electrode reaction is reduced by $\Delta R$ in comparison with point 2, just before the pre-running. Thus, it is favorable for raising the output of the fuel cell.

Through the above-mentioned analytical result as shown in FIG. 1 and FIG. 2, the present inventor finds that, the impregnation effect itself of the soaked electrolyte membrane is not enough, though it is effective for activation. The potential voltage of the cathode should be lowered as much as possible in activation treatment. That is, it should be as much as close to the standard electrode potential 0 v of the oxidation-reduction system of hydrogen, which is more favorable for activation of the fuel cell, and the cathode potential can be more easily restored than before the activation treatment. The cathode potential can be easily restored in comparison with before activation treatment when the cathode potential is lowered as much as possible in activation treatment. This reason has not been clarified, but it can be inferred that the electrochemical reduction reaction of oxygen working as an active material on the cathode is more restricted than before activation treatment, thus decreasing the cathode potential to promote other electrochemical reduction reactions (of the catalytic metal oxide and the adsorbed elements on the surface of the catalyst) on the cathode.

(2) The characteristics of the activation method of polymer electrolyte fuel cell according to a first aspect of the invention are as follows: an activation method of a polymer electrolyte fuel cell having a membrane electrode assembly having an electrolyte membrane formed by a polymer electrolyte membrane, and an anode and a cathode carrying a catalytic metal and sandwiching the electrolyte membrane, wherein the anode and the cathode are in electrical connection, and an activation treatment is carried out for opening an active site of the catalytic metal of the cathode. It can be inferred that the activation treatment promotes other electrochemical reduction reaction (of the catalytic metal oxide and the adsorbed elements on the surface of the catalyst) of the cathode. Thus, the active sites of the catalytic metal on the cathode are opened, and the catalytic metal of the cathode is activated, and the reaction resistance of the cathode is lowered.

(3) The characteristic of the method of activating the polymer electrolyte fuel cell according to a second aspect of the invention is as follows: an activation method of a polymer electrolyte fuel cell having a membrane electrode assembly having an electrolyte membrane formed by a polymer electrolyte membrane, and an anode and a cathode carrying a catalytic metal and sandwiching the electrolyte membrane, wherein the anode and the cathode are in electrical connection, and an activation treatment in which gas containing hydrogen is supplied to the anode, and gas containing oxygen is supplied to the cathode, and potential of the cathode is maintained at 0.5 v or less, to lower resistance of the electrode reaction, is carried out. The anode refers to the electrode where the electrochemical oxidation reaction occurs, and the cathode refers to the electrode where the electrochemical reduction reaction occurs. To maintain the cathode potential at 0.5 v or less means to take a potential on the basis of the standard electrode potential of the oxidation-reduction system of hydrogen as the 0 v. The upper limit value of the cathode potential in activation treatment can be 0.4 v, 0.3 v, 0.2 v, and 0.1 v, for example; the lower limit value of the cathode potential in activation treatment can be -1.0 v, -0.5 v, -0.1 v, -0.05 v, -0.005 v, and +0.002 v, for example. A potentiostat apparatus can be used to keep the cathode potential voltage at the above-mentioned level. The potentiostat apparatus is the device for applying current to keep a constant potential voltage between the two electrodes.

According to the activation method of polymer electrolyte fuel cell, in the second aspect of the invention, the analytical result obtained through AC impedance method shows that the reaction resistance of the electrode reaction decreases. Therefore, as shown in the after-mentioned experimental Example 1, after the activation treatment is carried out, the active sites of the cathode catalytic metal are opened, and the catalytic metal is activated. In power generation, the power generation voltage of the fuel cell is higher than that before the activation treatment.

In the activation method of the polymer electrolyte fuel cell in the second aspect of the invention, the activation treatment can be carried out just before the normal power generation running of the fuel cell is started, or after the normal power generation running temporarily stops when the unit voltage of the fuel cell is found descend, or in the process of power generation running. To be carried out during power generation running means that the activation method is carried out in the state of unceasing current output of the fuel cell. To be carried out after the generation running stops means that the activation method is carried out when the output current of the fuel cell stops.

According to the activation method of the polymer electrolyte fuel cell in the second aspect of the invention, it is possible to exemplify a mode in which a second conductive path whose electric resistance is relatively lower than that of a first conductive path in normal operation for generation of electricity. In this case, the activation treatment can be carried out in the condition that the anode and the cathode are in electrical connection by way of the second conductive path with a relatively lower resistance, instead of through the first conductive path which is used in the normal operation. In this situation, in the activation treatment, electrons ($e^-$) generated in the electrochemical oxidation reaction on the anode move to the cathode through the second conductive path with a relatively lower resistance, instead of through the first conductive path having a relatively higher resistance. Therefore, it is favorable for accelerating a speed of the activation treatment of the cathode.

(4) The characteristic of the method of activating the polymer electrolyte fuel cell according to a third aspect of the invention is as follows: an activation method of a polymer electrolyte fuel cell having a membrane electrode assembly having an electrolyte membrane formed by a polymer electrolyte membrane, and an anode and a cathode carrying a catalytic metal and sandwiching the electrolyte membrane, wherein the anode and the cathode are in electrical connection, and an activation treatment is carried out by supplying gas containing hydrogen to the anode and supplying non-oxidant gas to the cathode.

The non-oxidant gas can be inert gas (nitrogen gas, argon gas and so on) or hydrogen gas, or the mixture of these gases. According to the activation method of the polymer electrolyte fuel cell in the third aspect of the invention, it can be inferred that, as the gas containing hydrogen is supplied to the anode in the condition that the anode and the cathode are in electrical connection, hydrogen is decomposed into protons ($H^+$) and electrons ($e^-$) by electrochemical oxidation reaction on the anode, the electrons ($e^-$) move to the cathode by the connection, and the electrons ($e^-$) are applied to electrochemical reduction reaction on the cathode.

In addition, in activation treatment, non-oxidant gas, namely, the inert gas such as nitrogen gas, argon gas and so on, hydrogen gas and so on, the mixture of these gases (purge gas), which plays the role of the activating gas, which gas is supplied to the cathode, so that an oxygen shortage condition is actively generated on the cathode during the activation treatment. Therefore, it can be inferred that the electrochemical reduction reaction of other substances is conducted more actively on the cathode than the electrochemical reduction reaction concerning oxygen molecules. That is, in the stages of manufacturing the fuel cell, placing it aside, and making power generation, it is inferred that the product such as oxide and so on is generated or substances are adsorbed on the surface of the catalytic metal of the cathode. In the activation treatment, the electrochemical reduction reaction in relation to the catalytic metal occurs, and the oxide and adsorbed elements on the catalytic metal are removed, so that the active sites of the cathode catalytic metal are opened, to activate the catalytic metal, and the reaction resistance of the electrode reaction on the cathode is lowered.

In the above-mentioned activation method, as the non-oxidant gas (purge gas) such as nitrogen gas and so on is supplied to the cathode, the gas functioned as the activating gas can be distributed evenly to each of the cells of the cathode even when the number of cells constituting the fuel cell is plural, so as to decrease the uneven activation treatment between all the cells.

According to the activation method of the polymer electrolyte fuel cell in the third aspect of the invention, as shown in the after-mentioned Example 2, the power generation voltage of the fuel cell after the activation treatment is raised as compared with before the activation treatment. According to the activation method of the polymer electrolyte fuel cell in the third aspect of the invention, the cathode potential can be 0.5 v or less. Due to this, the activation effect can be further promoted. Furthermore, in this method, the upper limit value of the cathode potential can be 0.4 v, 0.3 v, 0.2 v, and 0.1 v. In activation treatment, depending on conditions, the lower limit value of the cathode potential can be −1.0 v, −0.5 v, −0.1 v, −0.05 v, −0.005 v, and +0.002 v. In the activation method of the polymer electrolyte fuel cell in the third aspect of the invention, the activation treatment can be carried out just before the normal power generation running of the fuel cell is started, or after the normal generation running temporarily stops when the unit voltage of the fuel cell is found descend. However, the activation method of the polymer electrolyte fuel cell in the second aspect of the invention can be carried out after the manufacturing before shipping of the fuel cell or in the process of power generation.

(5) The characteristic of the method of activating the polymer electrolyte fuel cell according to a fourth aspect of the invention is as follows: an activation method of a polymer electrolyte fuel cell having a membrane electrode assembly having an electrolyte membrane formed by a polymer electrolyte membrane, and an anode and a cathode carrying a catalytic metal and sandwiching the electrolyte membrane, wherein the anode and the cathode are in electrical connection, and an activation treatment is carried out by supplying gas containing hydrogen to the anode and making the cathode an oxygen shortage condition.

According to the activation method of the polymer electrolyte fuel cell in the fourth aspect of the invention, it can be inferred as follows: The gas containing hydrogen is supplied to the anode in the condition that the anode and the cathode are in electrical connection. Therefore, hydrogen is decomposed into protons ($H^+$) and electrons ($e^-$) by electrochemical oxidation reaction on the anode, and the electrons ($e^-$) move to the cathode by the connection, and are applied to electrochemical reduction reaction on the cathode. According to the activation treatment, because the oxygen shortage condition is forcibly maintained on the cathode, the electrochemical reduction reaction concerning oxygen is conducted on the cathode, and at the same time, the electrochemical reduction reactions of other substances are conducted actively. That is, in the stages of manufacturing the fuel cell, placing it aside, and making power generation, it is thought that the product such as oxide and so on is generated or substances are adsorbed on the surface of the catalytic metal of the cathode. In the activation treatment, the electrochemical reduction reaction concerning the catalytic metal occurs, and the oxide and adsorbed elements on the catalytic metal are removed, so that the active sites of the cathode catalytic metal are opened to activate the catalytic metal and the reaction resistance of the electrode reaction on the cathode is lowered.

According to the fourth aspect, the activation treatment can be carried out under the oxygen shortage condition where the oxygen utilization rate is over 100%. The oxygen utilization rate can be over 120%, over 150% and over 200%. The oxygen shortage condition is enhanced by lowering the oxygen concentration in the gas to be supplied to the cathode, and the non-oxidant gas not containing oxygen can be used under the limit condition. In this state, the oxygen utilization rate is infinite, and there is no upper limit of oxygen utilization rate.

According to the activation method of the polymer electrolyte fuel cell in the fourth aspect of the invention, as shown in Example 3, the power generation voltage of the fuel cell after the activation treatment is raised as compared with before the activation treatment. The activation treatment can be carried out just before the normal power generation running of the fuel cell is started, or after the normal power generation running temporarily stops when the unit voltage of the fuel cell is found descend. Besides, the activation treatment can be carried out after the manufacturing before shipping of the fuel cell, or in the process of power generation. According to the activation method of the polymer electrolyte fuel cell in the fourth aspect of the invention, the cathode potential can be 0.5 v or less. Due to this, the activation effect can be further promoted. According to the activation method of the polymer electrolyte fuel cell in the fourth aspect of the invention, in activation treatment, the upper limit value of the cathode potential can be 0.4 v, 0.3 v, 0.2 v, and 0.1 v, and the lower limit value can be −1.0 v, −0.5 v, −0.1 v, −0.05 v, −0.005 v, and +0.002 v.

(6) Accordance to the activation method of the polymer electrolyte fuel cell in the first to the fourth aspect of the invention, when the cathode potential is lower than that of the anode in activation treatment, the electrons supplied from the anode to the cathode are limited. Therefore, the activation treatment can be carried out by forcibly supplying electrons from the external apparatus (the external environment) to the cathode. In this case, the active sites of the cathode catalytic metal are opened, and the cathode catalyst is activated. The external apparatus can be another fuel cell, a capacitor and the like.

EFFECT OF THE INVENTION

The present invention provides an activation method of the polymer electrolyte fuel cell which is advantageous for activation and can raise cell voltage. It can be inferred that the active sites of the catalytic metal of the cathode can be opened by the activation treatment.

BEST MODE FOR CARRYING OUT THE INVENTION

Embodiment A

Figure 3:
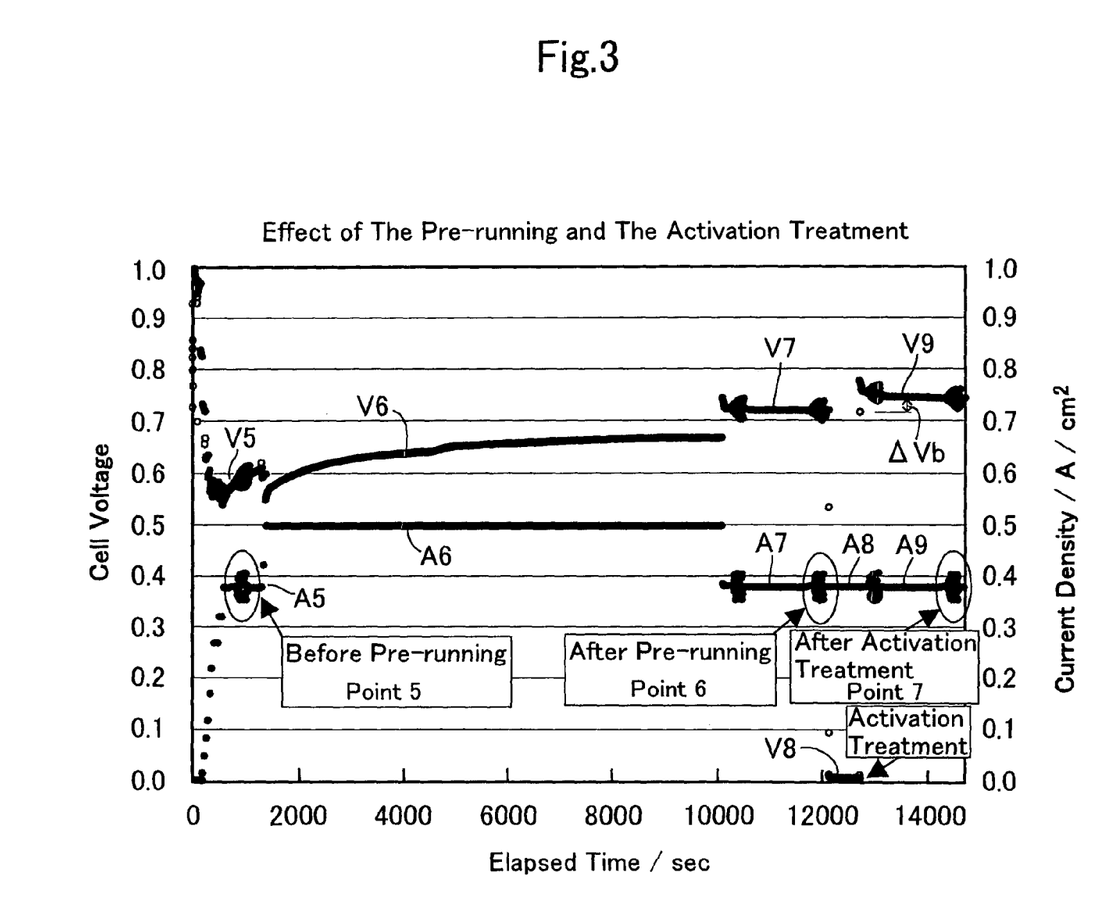
FIG. 3 is the curve diagram indicating the transition of the cell voltage and current density according to the third aspect, before and in pre-running, and in and after activation treatment.

According to Embodiment A, in a series of power generation running, pre-running equivalent to the prior art and an activation treatment equivalent to the third aspect of the invention (non-oxidant gas was introduced into a cathode when the activation treatment) were carried out. It is shown in FIG. 3. In the pre-running equivalent to the prior art, pure hydrogen gas (pressure: normal pressure) was supplied to an anode, and at the same time, air (pressure: normal pressure) was supplied to a cathode, and the current density was increased to a heavy current of 0.5 A/cm$^2$ (characteristic line A6). According to Embodiment A, in the activation treatment equivalent to the third aspect of the invention, in the condition that the anode and cathode were in electrical connection, the pure hydrogen gas (pressure: normal pressure) was supplied to the anode, and nitrogen gas for working as non-oxidant gas (pressure: normal pressure) was supplied to the cathode, and the current density was set to be 0.38 A/cm$^2$ (characteristic line A8).

In FIG. 3, characteristic lines V5-V9 indicate voltage, and characteristic lines A5-A9 indicate current. The characteristic lines A5 and V5 in FIG. 3 indicate the condition that the power generation running of the fuel cell starts. The characteristic lines A6 and V6 indicate the condition that the pre-running equivalent to the prior art is carried out after the starting of the power generation running. The plot of "○" as shown in FIG. 3 is the mark of making Cole-Cole Plot. In Embodiment A, the characteristic lines A7 and V7 in FIG. 3 indicate the condition that the power generation running is carried out after the conventional pre-running. In Embodiment A, the characteristic lines A8 and V8 in FIG. 3 indicate the condition that the activation treatment equivalent to the third aspect of the invention is carried out. When the activation treatment equivalent to the third aspect of the invention is carried out, as shown in the characteristic line A8, the current density is set at 0.38 A/cm$^2$, and as shown in the characteristic line V8, the cell voltage is set around 0 v in the plus range (about 0.005 v) Since the cell voltage is the potential of the difference between the cathode and the anode and the voltage of the anode is regarded as 0 v, the cell voltage will substantially be the potential of the cathode in fact.

In Embodiment A, the characteristic lines A9 and V9 in FIG. 3 indicate the condition that the normal power generation running is carried out after the activation treatment equivalent to the third aspect of the invention. As understood from a comparison between the characteristics lines V7 and V9 in FIG. 3, it confirmed that when the activation treatment equivalent to the third aspect of the invention (in which the non-oxidant gas was introduced into the cathode when the activation treatment) was carried out, the voltage was ΔVb higher than that of the pre-running equivalent to the prior art, thereby achieving the activation effect. Furthermore, according to the experiment shown in FIG. 3, since the current density is high, namely 0.38 A/cm², the cell voltage is not originally high.

Figure 4:
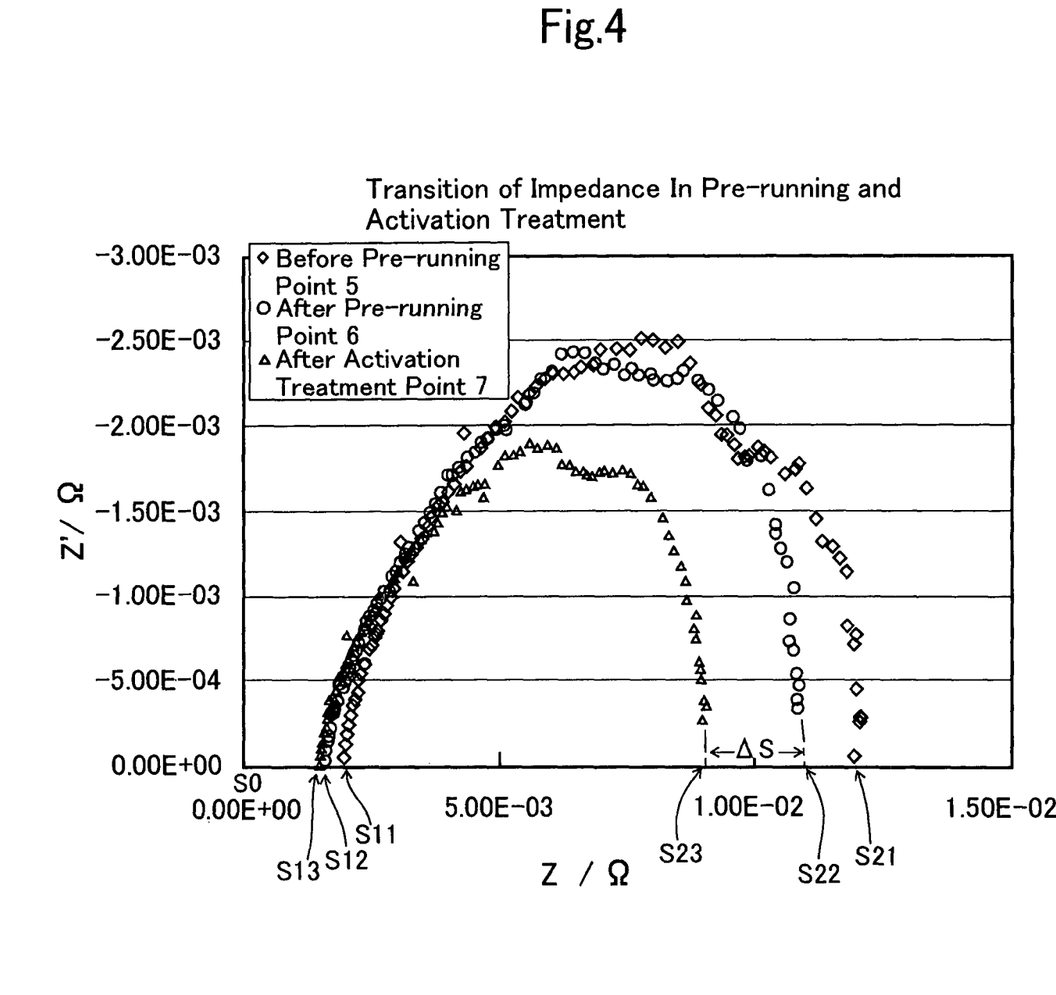
FIG. 4 is the curve diagram indicating the analytical result with AC impedance method, and shows the transition of the electrolyte membrane resistance and the electrode reaction resistance before, and after pre-running and after activation treatment according to the third aspect.

In FIG. 3, point 5 indicates the condition before the pre-running equivalent to the prior art. Point 6 indicates the condition after the pre-running equivalent to the prior art and before the activation treatment equivalent to the third aspect of the invention. Point 7 indicates the condition after the activation treatment equivalent to the third aspect of the invention. As for the point 5, point 6 and point 7, as the same as the aforementioned, an analysis was carried out by an electrochemical impedance method. FIG. 4 indicates the analytical result (Cole-Cole Plot) by an electrochemical impedance method in Embodiment A. The horizontal axis of FIG. 4 indicates a real component of impedance, and the vertical axis of FIG. 4 indicates an imaginary component of impedance. As shown in FIG. 4, before the pre-running equivalent to the prior art (point 5), the cell resistance is equivalent to S11–S0, and the reaction resistance of the cathode electrode reaction is equivalent to S21–S11, and thereby the reaction resistance of the cathode electrode reaction is relatively high. In addition, as shown in FIG. 4, after the pre-running equivalent to the prior art (in which the current density is set to be 0.5 A/cm²) is carried out (point 6), the cell resistance is equivalent to S12–S0, and the reaction resistance of the electrode reaction is equivalent to S22–S12, and thereby the cell resistance and the electrode reaction resistance is decreased. It is inferred that the water content of the electrolyte membrane gradually increases by the pre-running equivalent to the prior art of the fuel cell.

In addition, as shown in FIG. 4, after the activation treatment equivalent to the third aspect of the invention (the treatment for supplying the nitrogen gas as the non-oxidant gas to the cathode) is carried out on the fuel cell (point 7), the cell resistance is equivalent to S13–S0, and the reaction resistance of the electrode reaction is equivalent to S23–S13. It was analyzed that although the cell resistance was almost unchanged, the reaction resistance of the electrode reaction decreased as much as ΔS. Through the above-mentioned analytical results, the activation treatment equivalent to the third aspect of the invention (in which nitrogen is supplied to the cathode) is effective in lowering the reaction resistance of the electrode reaction, and it is favorable for improving the output voltage of the fuel cell.

Embodiment B

Figure 5:
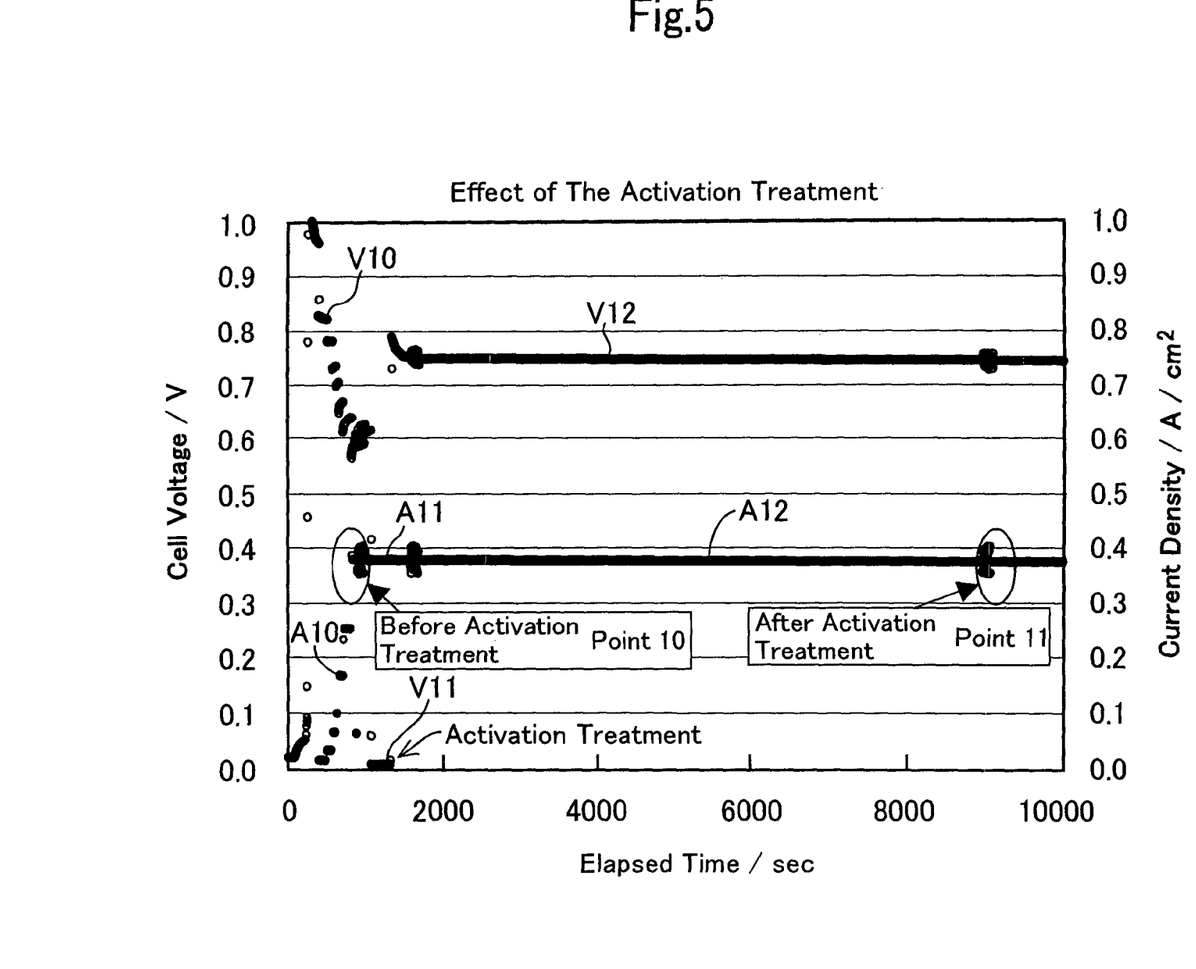
FIG. 5 is the curve diagram indicating the transition of the unit voltage and current density according to the fourth aspect, before, in and after activation treatment.

In Embodiment B, an activation treatment equivalent to the fourth aspect of the invention (in which the cathode is set to be an oxygen shortage condition) is carried out. In Embodiment B, the activation treatment is carried out in the oxygen shortage condition in which an oxygen utilization rate is over 100%. According to Embodiment B, when a fuel cell started, pure hydrogen gas (pressure: normal pressure) was supplied to an anode, and at the same time, air (pressure: normal pressure) was supplied to a cathode, and power generation running was carried out. In FIG. 5, characteristic lines V10, V11 and V12 indicate voltage, and characteristic lines A10, A11 and A12 indicate current. The characteristic lines A10 and V10 in FIG. 5 indicate the condition just after the starting of the power generation running of the fuel cell. The characteristic lines A11 and V11 in FIG. 5 indicate the condition that the activation treatment equivalent to the fourth aspect of the invention is carried out. The characteristic lines A12 and V12 in FIG. 5 indicate the condition of power generation running after the activation treatment. The plot of "○" as shown in FIG. 5 is the mark of making Cole-Cole Plot.

As above-mentioned, in Embodiment B, the characteristic lines A11 and V11 indicate the condition that the activation treatment equivalent to the fourth aspect of the invention is carried out. According to the activation treatment equivalent to the fourth aspect of the invention, when the pure hydrogen gas (pressure: normal pressure) was supplied to the anode and the air (pressure: normal pressure) was supplied to the cathode, the activation treatment was carried out. In the activation treatment, the current density is maintained at 0.38 A/cm² as shown in the characteristic line A11, and the cell voltage descends to around 0 v (about 0.01 v) as shown in the characteristic line V11. Since the cell voltage is the difference of the potential between the anode and the cathode and the voltage of the anode is regarded as 0 v, the cell voltage will be the potential of the cathode.

Figure 6:
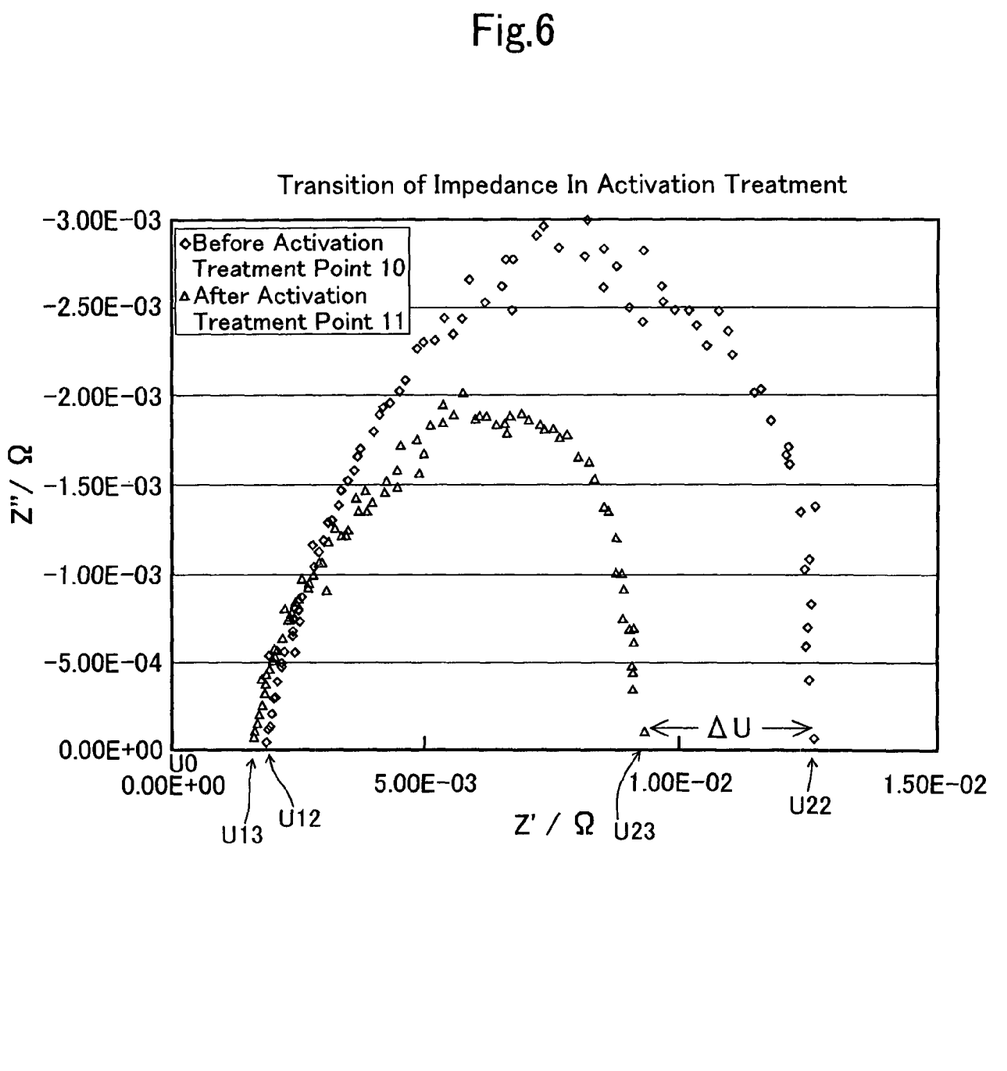
FIG. 6 is the curve diagram indicating the analytical result with AC impedance method, and shows the transition of the electrolyte membrane resistance and the electrode reaction resistance in pre-running and the activation treatment according to the fourth aspect.

As for the condition before the starting of the activation treatment equivalent to the fourth aspect of the invention (point 10) and the condition after that (point 11), as the same as the aforementioned, an analysis was carried out by an electrochemical impedance method. The time ranging from after the activation treatment to point 11 is long, in order to confirm the continuous effect of activation effect. FIG. 6 indicates the analytical result (Cole-Cole Plot). The horizontal axis of FIG. 6 indicates the real component of impedance and the vertical axis of FIG. 6 indicates the imaginary component of impedance.

As shown in FIG. 6, before the activation treatment equivalent to the fourth aspect of the invention is carried out for the fuel cell (point 10), the cell resistance is equivalent to U12–U0, and the reaction resistance of the electrode reaction is equivalent to U22–U12. In addition, after the activation treatment equivalent to the fourth aspect of the invention is carried out (point 11), the cell resistance is equivalent to U13–U0, and the reaction resistance of the electrode reaction is equivalent to U23–U13, and thereby it is analyzed that the reaction resistance of the electrode reaction is decreased as much as ΔU. According to the above-mentioned analytical result, the activation treatment equivalent to the fourth aspect of the invention (in which the cathode is set to be an oxygen shortage condition) is effective in lowering the reaction resistance of the electrode reaction, and it is favorable for improving the output voltage of the fuel cell.

EXAMPLES

The present invention will be hereinafter described in Example 1-Example 3.

Example 1

Example 1 is equivalent to the first aspect and the second aspect of the invention. First, 300 g of carbon black were mixed in 1000 g of water to make water mixture. The water mixture was agitated in an agitator for the predetermined time (10 minutes) to make agitated water. Then 250 g of tetrafluoroethylene (hereafter referred to as "PTFE", made by Daikin Industries Ltd.), containing the original dispersion solution with 60 wt % in concentration (trade name: POLYFLON, D1 grade), was added to the agitated water, and agitated for the predetermined time (10 minutes) to form a carbon ink.

A carbon paper (TORAYCA TGP-060, 180 μm thick, made by TORAY INDUSTRIES, INC.) was dipped into the carbon ink, and was soaked in the above-mentioned PTFE enough to form a raw material.

Next, using a dry oven which was maintained at 80° C. to evaporate the residual moisture contained in the raw material. After that, the PTFE in the raw material was sintered at the temperature of 390° C. for 60 minutes until the hydrophobic carbon paper was made. Then, 12 g of platinum-loading carbon catalyst with a platinum concentration of 46 wt % (TEC10E60E, made by Tanaka Precious Metals Industry K. K.) was fully mixed with 106 g of ionic exchange resin solution with a concentration of 5 wt % (SS-1080, made by Asahi Kasei Corporation), 23 g of water, and 23 g of isopropyl alcohol as plasticizer to form a catalytic paste.

Then, the catalytic paste was coated on a tetrafluoroethylene sheet by a doctor blade method in order that the platinum loading amount was 0.6 mmg/cm$^2$, and a catalytic layer was formed. After that, the drying was carried out. Due to this, a cathode sheet having tetrafluoroethylene sheet was formed. Platinum works as a cathode catalytic metal.

Further, an alloy-loading carbon catalyst (TEC61E54, made by Tanaka Precious Metals Industry K. K.) in which an alloy of platinum (30 wt % in loading concentration) and ruthenium (23 wt % in loading concentration) was loaded, which was used instead of the above-mentioned platinum-loading carbon to form an anode sheet having tetrafluoroethylene sheet by the same method as the aforementioned.

According to the Example, the 25 μm-thick ionic exchange membrane (Nafion 111, made by Du Pont Kabushiki Kaisha) was used as an electrolyte membrane. The electrolyte membrane was sandwiched by the cathode sheet and the anode sheet as aforementioned. And the catalytic layer mainly composed of platinum as a catalytic metal exists between the electrolyte membrane and the cathode sheet. The catalytic layer mainly composed of platinum and ruthenium as a catalytic metal exists between the electrolyte membrane and the anode sheet. In the condition that the temperature was set to be 150° C. and pressure is 10 MPa, these two catalytic layers were hot-pressed for the predetermined time (1 minute) to be transferred on two sides of the electrolyte membrane respectively. After that, the aforementioned tetrafluoroethylene sheet was peeled off.

A gas diffusion layer for the cathode was set on the external side of the cathode catalytic layer, and a gas diffusion layer for the anode was set on the external side of the anode catalytic layer. In the condition that the temperature was set to be 140° C. and the pressure was 8 Mpa, these two diffusion layers were hot-pressed for the predetermined time (3 minutes) to form a membrane electrode assembly (MEA). The membrane electrode assembly formed a single cell.

Figure 7:
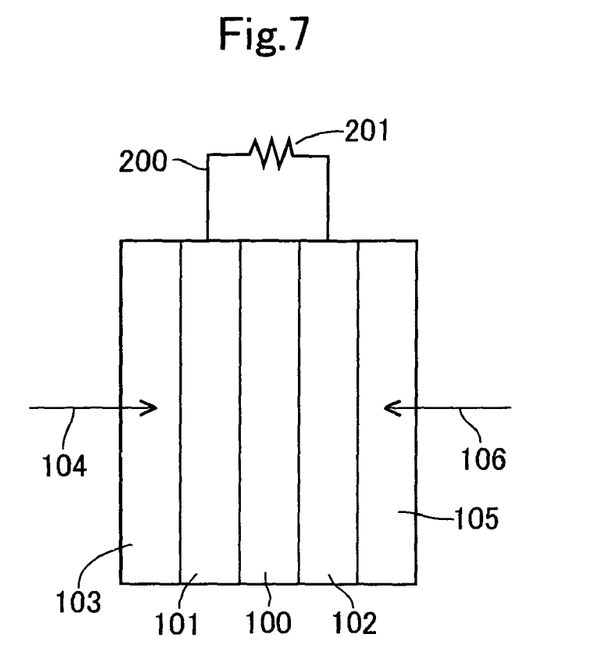
FIG. 7 is the cell structure diagram according to Example 1.

FIG. 7 shows the conceptual diagram of a cell. As shown in FIG. 7, the cell has an electrolyte membrane 100 formed by a solid high molecular membrane, and an anode 101 and a cathode 102 for sandwiching the electrolyte membrane 100. The gas containing hydrogen is supplied from a gas flow distribution plate 103 to the anode 101 through a flow passage 104. The air is supplied from a gas distribution plate 105 to the cathode 102 through a flow passage 106. Here, the air is equivalent to the oxidant gas containing oxygen. The gas containing hydrogen is the natural-gas reforming simulated gas for simulating fuel gas which is used frequently in fact.

At the time of the activation treatment, in the condition of the electrical connection formed by the anode 101 and the cathode 102 which were connected by a conductor 200 via a load 201, when the cell temperature was set to be 75° C., the air (oxygen utilization rate: 40%) was supplied to the cathode 102 and the natural-gas reforming simulated gas containing 10 ppm of CO (hydrogen utilization rate: 90%) was supplied to the anode 101 under the normal pressure, and in which the potential of the cathode 102 was set to be 0.05 v (around 0 v) and maintained for 5 minutes; thus the activation treatment was carried out. In the activation treatment, the anode 101 was used as a negative electrode and the cathode 102 was used as a positive electrode. However, in the activation treatment of Example 1, the oxygen utilization rate of the cathode 102 can set to be 50% or less. This aims to suppress flooding. In the Example, the potential was set to be 0.05 v and maintained at a constant potential voltage by a potentiostat stabilizer. After the activation treatment, when the normal generation running was carried out at 0.38 A/cm$^2$, as shown in Table 1, the high cell voltage as 0.725 v was obtained and the cell voltage was improved as compared with the condition before the activation treatment.

The present inventor infers that the reason for the improvement of the cell voltage output in the activation treatment of Example 1 is as follows. In the activation treatment, because the power generation is carried out with the cell voltage of around 0 v (0.05 v), it is inferred that the electrochemical reduction reaction about oxygen is generated on the cathode 102, and at the same time, the electrochemical reduction reaction about other substances is generated. Namely, the reduction reaction of platinum oxide or adsorbed elements (including foreign substances) is generated on the surface of the platinum constituting the cathode 102, so that the active sites of platinum are opened at the cathode 102, to activate the platinum, so that the reaction resistance of the electrode reaction is lowered, and the cell voltage output is much improved than that before the activation treatment.

Example 2

Figure 8:
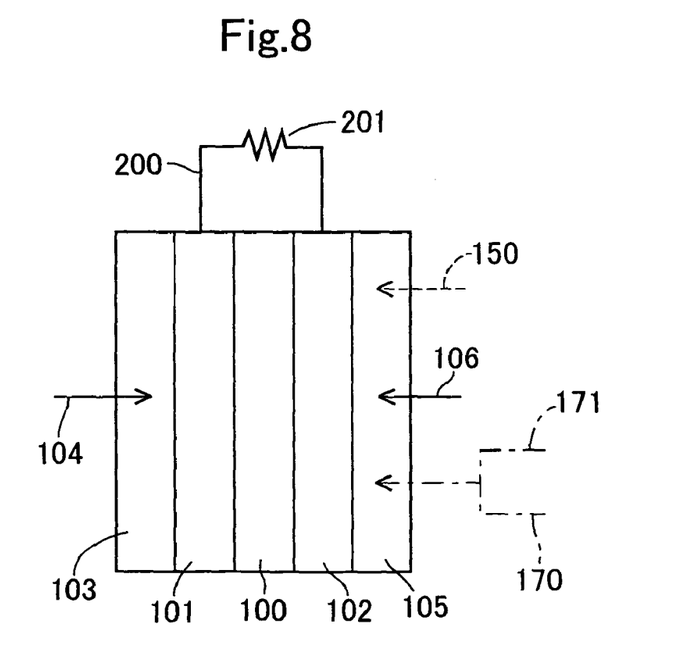
FIG. 8 is the cell structure diagram according to Example 2.

Example 2 is equivalent to the first aspect and the third aspect of the invention (in which non-oxidant gas is introduced into the cathode). A membrane electrode assembly (MEA) made in the Example 1 was used to form a single cell. As shown in FIG. 8, the single cell has an electrolyte membrane 100 formed by a polymer electrolyte membrane and an anode 101 and a cathode 102 for sandwiching the electrolyte membrane 100. The gas containing hydrogen is supplied from a gas distribution plate 103 to the anode 101 through a flow passage 104. The air is supplied from a gas distribution plate 105 to the cathode 102 through a flow passage 106. Moreover, the cathode 102 is connected with a flow passage 150, which supplies the nitrogen gas (non-oxidant gas) to the cathode.

And, at the time of the activation treatment, in the condition of the electrical connection formed by the anode 101 and the cathode 102 which were connected with the conductor 200 via a load 201, when the cell temperature was set to be 75° C., nitrogen gas (purge gas) was supplied to the cathode 102 from the flow passage 150 while the air supply was stopped, and the natural-gas reforming simulated gas (hydrogen utilization rate: 90%) containing 10 ppm of CO was supplied to the anode 101 under the normal pressure respectively. Then, in the condition of the connection with electronic load, the activation treatment was carried out for 5 minutes, while the current density was maintained at 0.38 A/cm$^2$, and the electric potential of the cathode 102 was set about 0.01 v. The aforementioned natural-gas reforming simulated gas is the gas containing hydrogen. In the Example, the potentiostat stabilizer is not used because of the controlled current running.

After the above-mentioned activation treatment, the air (oxygen utilization rate: 40%) was supplied to the cathode 102 through a flow passage 106, and the natural-gas reforming simulated gas was supplied to the anode 101, and the normal power generation running was conducted at 0.38 A/cm². As shown in Table 1, the high cell voltage as 0.724 v was gained, and the cell voltage was improved. The oxygen utilization rate (%) means (the actual oxygen amount used in power generation/the oxygen amount supplied to the fuel cell)×100%. The hydrogen utilization rate (%) means (the actual hydrogen amount used in power generation/the hydrogen amount supplied to the fuel cell)×100%.

In a model test, the specific oxygen utilization rate (%) was calculated as follows. Here, electrode area is S (cm²), current density is i (A/cm²) and cell number is n. The supply amount of oxygen in unit time N (mol/sec), which is necessary for power generation of the fuel cell is as follows.

$$N=(S \times i \times n)/4F.$$

In this model test, S is 59 cm²; i is 0.38 A/cm² and n is 15. The necessary supply amount of oxygen N (mol/sec) is $$N=(S \times i \times n)/4F=(59 \times 0.38 \times 15)/(4 \times 96500)=0.000871 \text{ (mol/sec)}.$$

In the case of air, N/0.21=0.00415 (mol/sec).

When it is converted into air volume, 0.00415×22.4=0.0929 liter/sec.=5.57 liters/minute.

So, in the model test, if 5.57 liters/minute of air is supplied to the cathode, the oxygen utilization rate will be 100%. If 13.9 litters/minute of air is supplied to the cathode, the oxygen utilization rate will be 40%. Namely, (5.57/13.9)×100%=40%.

The present inventor infers that the reason for the improvement of the cell voltage output in the activation treatment of Example 2 is as follows. In the activation treatment, because the nitrogen gas (purge gas) is supplied to the cathode 102 instead of air, it is inferred that the oxygen shortage condition is actively generated on the cathode 102, and the electrochemical reduction reaction of other substances is conducted more actively on the cathode 102 than the electrochemical reduction reaction of oxygen. Namely, it is likely that the product such as platinum oxide and so on is generated on platinum constituting a catalyst in the cathode 102, or substances are adsorbed on the catalytic metal. Therefore, the reduction reaction of the product such as platinum oxide and so on, or the reduction reaction of adsorbed elements occurs by the activation treatment, so that the active sites of platinum as catalyst at the cathode 102 are opened to activate the platinum, and thereby the reaction resistance of the electrode reaction on the cathode is lowered and the cell voltage output is improved. As above-mentioned, in the activation treatment in which the nitrogen gas and so on is supplied to the cathode 102, the gas containing hydrogen is supplied to the anode 101, as the nitrogen gas can be distributed evenly to the cathode 102 of each cell even when the number of cells constituting the fuel cell is plural, so it is possible to decrease the uneven activation treatment between all the cells.

Example 3

Example 3 is equivalent to the first aspect and the fourth aspect of the invention (in which the cathode is forcibly set to an oxygen shortage condition). A membrane electrode assembly (MEA) made in the Example 1 was used to form a single cell. FIG. 7 is applied to Example 3. As shown in FIG. 7, the single cell has an electrolyte membrane 100 formed by a polymer electrolyte membrane and an anode 101 and a cathode 102 for sandwiching the electrolyte membrane 100. The gas containing hydrogen is supplied from a gas distribution plate 103 to the anode 101 through a flow passage 104. The air is supplied from a gas distribution plate 105 to the cathode 102 through a flow passage 106.

And, in the condition of the electrical connection formed by the anode 101 and the cathode 102 which were connected with the conductor 200 via a load 201, when the cell temperature was set to be 75° C., the air (oxygen utilization rate: 200%) was supplied to the cathode 102, and natural-gas reforming simulated gas (hydrogen utilization rate: 90%) containing 10 ppm of CO was supplied to the anode 101 under the normal pressure respectively, and while the current density was maintained at 0.38 A/cm², and the potential of the cathode 102 was set to be around 0.01 v, the activation treatment was carried out for 5 minutes. In the Example, the potentiostat stabilizer is not used because of the controlled current running.

According to the Example, as above-mentioned, the oxygen utilization rate of the cathode 102 is 200%. This means that the cathode 102 is set to an oxygen shortage condition, and that the electrochemical reduction reaction is conducted at the cathode 102 more than the electrochemical reduction reaction based on the amount of the oxygen in the air supplied to the cathode 102.

It is inferred that: (1) the reduction reaction of the product such as platinum oxide and the like on platinum constituting a catalytic metal, (2) the electrochemical reduction reaction of adsorbed elements on the catalytic metal, or (3) the electrochemical reduction reaction of protons (H⁺) penetrated from the anode 101 to the cathode 102 through the electrolyte membrane 100—these reduction reactions are generated at the cathode 102. After the above-mentioned activation treatment was carried out, when the oxygen utilization rate was changed to 40%, and the normal power generation running was carried out at 0.38 A/cm², as shown in Table 1, the high cell voltage as 0.725 v could be obtained and the cell voltage was improved in comparison with the cell voltage before the activation treatment.

The present inventor infers that the reason for the improvement of the cell voltage output in the activation treatment of Example 3 is as follows. In the activation treatment, because the oxygen shortage condition is forcibly maintained on the cathode 102, the electrochemical reduction reaction concerning oxygen is conducted on the cathode 102, and at the same time, the electrochemical reduction reaction of other substances is conducted actively. Namely, it is likely that the product such as platinum oxide and so on or adsorbed elements is generated on platinum constituting a catalyst in the cathode 102. It is inferred that the electrochemical reduction reaction of the product such as platinum oxide and the like on platinum constituting a catalytic metal in the cathode 102, and the electrochemical reduction reaction of adsorbed elements on the catalytic metal is conducted, so that the active sites of platinum as catalyst are opened, and thereby the reaction resistance of the electrode reaction is lowered and the cell voltage output is improved.

Comparative Example 1

A single cell was formed by the membrane electrode assembly (MEA) made in Example 1. In the condition that the cell temperature was set to be 75° C., the air (oxygen utilization rate: 40%) was supplied to a cathode 102, and the natural-gas reforming simulated gas (hydrogen utilization rate: 90%) containing 10 ppm of CO was supplied to an anode 101 under the normal pressure, respectively. In this case, as shown in Table 1, the cell voltage output of 0.670 v was gained, which was lower than that in Examples 1-3.

Comparative Example 2

A single cell was formed by the membrane electrode assembly (MEA) made in Example 1. In the condition that the cell temperature was set to be 75° C., the air (oxygen utilization rate: 40%) was supplied to a cathode 102, and the natural-gas reforming simulated gas (hydrogen utilization rate: 90%) (gas simulating the reformed gas which has been reformed from the natural-gas) containing 10 ppm of CO was supplied to an anode 101 under the normal pressure, respectively, and then, the pre-running was carried out at 0.50 A/cm2 for 2 hours. The pre-running is equivalent to that of the prior art. The potential of the cathode in the pre-running of Comparative Example 2 was 0.55-0.66 v. After that, when the normal generation running was carried out at 0.38 A/cm², as shown in Table 1, the cell voltage output of 0.685 v was gained, which was lower than that in Examples 1-3. As known from the above-mentioned result, according to the solid high polymer electrolyte type fuel cell in Examples 1-3 which carries out the activation treatment, the cell voltage output was superior to that of the solid high polymer electrolyte type fuel cell in comparative Examples 1 and 2.

TABLE 1

|  | Example 1 | Example 2 | Example 3 | Comparative Example 1 | Comparative Example 2 |
| --- | --- | --- | --- | --- | --- |
| Cell Voltage V | 0.725 | 0.724 | 0.725 | 0.670 | 0.685 |

(Surface of Platinum Electrode)

According to the prior art documents, the following reactions occur on the surface of the platinum electrode:

$$[PtCl_4]^{2-}+2e^-=Pt+4Cl^-$$

standard oxidation reduction potential 0.758 v $$PtO+2H^++2e^-=Pt+H_2O$$

standard oxidation reduction potential=0.98 v $$Pt^{2+}+2e^-=Pt$$

standard oxidation reduction potential=1.188 v

Here, the reaction in which the oxidation reduction potential is clear is shown, but the same applies to the reaction with other substances. The standard oxidation reduction potential is the balance potential when the concentration (activity) of oxidation electrode and reduction electrode is set at 1. According to the formula of Nernest, the balance potential of oxidation reduction reaction of $$M^{n+}+ne^-=M$$

shows the following relation between the concentration of each oxidation elements $C_M^{n+}$ and reduction elements $C_M$ $$E=E_o+(RT/nF)\ln(C_M^{n+}/C_M)$$

In the equation: $E_o$ is the standard oxidation reduction potential, R is the gas constant, T is the absolute temperature, F is the Faraday constant. Therefore, when the concentration of oxidation elements is low, the balance potential is lower than the standard oxidation reduction potential, which means the oxidation reduction reaction is to be generated a lower potential. On the surface of the fuel cell, because it is guessed that the concentration of the oxidation elements of platinum and other substances is less than 1 in fact, it can be expected that the balance potential is lower than the standard oxidation reduction potential.

According to the prior art document, the following absorption is occurred on the surface of the platinum electrode at a range of electrode potential of 0.7-1.0 v:

$$Pt+H_2O+e^-=Pt.OH+H^+$$

When the air (oxygen) exists on the surface of the platinum electrode, $$\tfrac{1}{2}O_2+2e^-+2H^+=H_2O$$

standard oxidation reduction potential=1.229 v

The platinum electrode potential is regulated by the aforementioned oxidation reduction reaction of oxygen. In the manufacturing stage of the fuel cell, in the discharge stage before use, or depending on the electrode potential in a power generation, the platinum oxidation or substance adsorption can be generated on the surface of platinum electrode. As a result, the active sites on the surface of the platinum are reduced. It is necessary to pull down the platinum electrode potential below the balance potential of these reactions (for example around 0 v) once, in order to reduce these products or to separate these adsorbed elements from the platinum, and then, to open the occupied active sites. It is inferred that when the platinum electrode potential comes to lower than the balance potential thereof, the reduction or separation speed is accelerated, and the active sites on the platinum surface are opened to activate the platinum. There are two main methods to pull down the platinum electrode potential: one is to raise the speed of oxygen reduction reaction (electrode current density) to enlarge a polarization, and the other is to remove oxygen to regulate the platinum electrode potential by other oxidation-reduction reactions.

Other Examples

According to Example 2, at the time of the activation treatment, as shown in FIG. 8, the gas containing hydrogen is supplied to an anode 101 through a flow passage 104, and at the same time, the nitrogen gas as non-oxidant gas is supplied to a cathode 102 through a flow passage 150. However, without restricting to this, another example may be carried out—while the gas containing hydrogen is supplied to the anode 101 through the flow passage 104, mixed gas (non-oxidant gas) containing a diluted concentration of hydrogen with respect to the gas supplied to the anode 101 can be supplied to the cathode 102.

In this case, as shown in FIG. 8, a flow passage 170 in which hydrogen gas flows and a flow passage 171 in which the diluting gas such as nitrogen gas flows can be communicated with a flow distribution plate 105 of the cathode 102. Then, the mixed gas in which the hydrogen gas from the flow passage 170 is mixed with the diluting gas of the flow passage 171 is supplied to the cathode 102.

Figure 9:
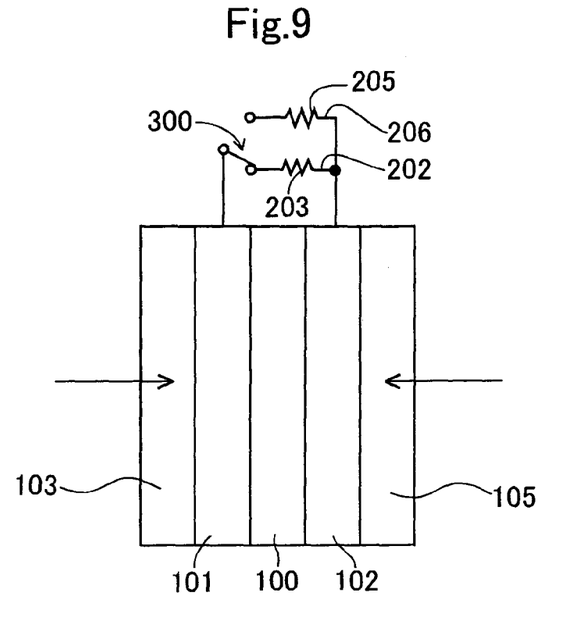
FIG. 9 is the cell structure diagram modified in another form according to Examples 1, 2 and 3.

FIG. 9 indicates another form in Example 1, 2 and 3. According to these, as shown in FIG. 9, a small load 205 whose electric resistance is relatively smaller than that of a load 203 which is driven by normal power generation reaction. The small load 205 is set between the anode 101 and the cathode 102, and is electrically parallel to the load 203. In addition, a switching element 300 is mounted. The switching element 300 has a function for switching over between a first conductive path 202 connecting the load 203 driven by normal generation reaction and a second conductive path 206 connecting the small load 205 which has relatively small electric resistance.

At the time of the normal generation running, when the first conductive path 202 connecting the load 203 driven by normal generation reaction is switched on by the switching element 300, and the second conductive path 206 connecting the small load 205 is switched off. On the contrary, at the above activation treatment, the first conductive path 202 connecting the load 203 is switched off by the switching element 300, and at the same time, the second conductive path 206 connecting the load 205 is switched on. Therefore, in the above-mentioned activation treatment, because the electrons (e⁻) generated in oxidation reaction on the anode 101 move to the cathode 102 through the second conductive path 206 having the small load 205 whose electric resistance is relatively small, so that this is advantageous for accelerating the activation treatment speed and shortening the time for activation treatment on the cathode 102.

When the gas containing oxygen is supplied to the cathode 102, because the oxygen reduction reaction occurs on the cathode 102 by priority. Thus, allowing a lot of current to flow through the small load 205 is especially advantageous for raising the reduction reaction on the cathode 102, and for raising the reduction reaction of the platinum oxide and adsorbed elements on the catalytic metal. As the small load 205, one having small electric resistance can be set, and the resistance of the conductive line forming the second conductive path 206 can be a substitution.

Figure 10:
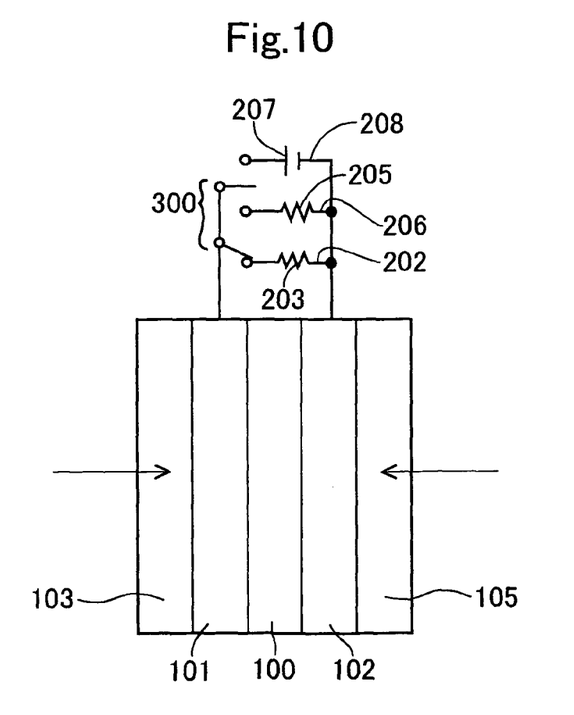
FIG. 10 is the cell structure diagram modified in other forms according to Examples 1, 2 and 3.

FIG. 10 indicates the other form in Examples 1, 2 and 3. According to these, as shown in FIG. 10, a battery 207 is set on a conductive path 208 as an external supply means for supplying electrons to the cathode 102. It is possible that a negative electrode of the battery 207 is connected to the cathode 102 while a positive electrode of the battery 207 is connected to the anode 101. The conductive path 208 is set parallel to the conductive paths 202 and 206. In the activation treatment, the potential of the cathode 102 is sometimes lower than that of the anode 101, depending on conditions. In this case, as electron energy potential of the cathode 102 is higher than that of the anode 101, it is likely that the electrons supplied from the anode 101 to the cathode 102 are limited, and then, the reduction reaction based on the activation treatment is limited on the cathode 102. So, the activation treatment can be carried out by switching on the switching element 300, and supplying electrons forcibly from the external battery 207 to the cathode 102 of the fuel cell. In this case, the electrochemical reduction reaction (reduction reaction of catalytic oxide and adsorbed elements) on the cathode 102 is secured, and the active sites of the catalytic metal on the cathode 102 are opened. The battery 207 can be replaced with a capacitor.

Applicable Example

Figure 11:
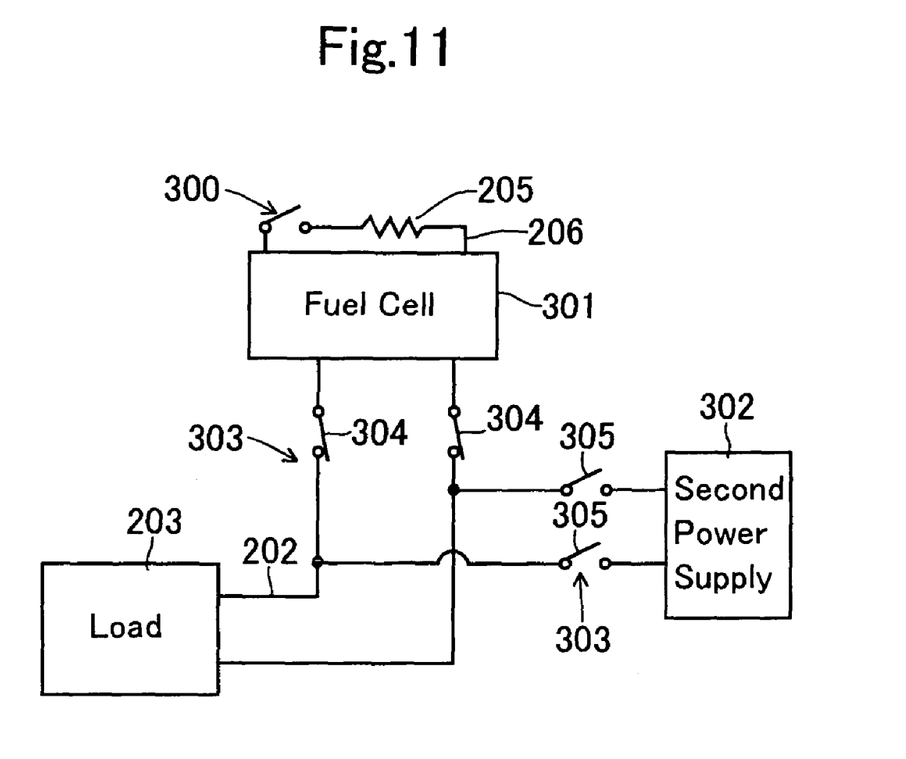
FIG. 11 is the structure diagram of power generation system of the fuel cell according to applicable Examples.

FIG. 11 indicates an applicable Example. As shown in FIG. 11, a power generating system of the fuel cell has a polymer electrolyte fuel cell 301 formed by a stack of multi-layered cells, a first conductive path 202 having a load 203 driven by the power generation reaction of the fuel cell 301, a second conductive path 206 connecting a load 205, whose electric resistance is relatively smaller than that of the load 203, a switching element 300 used to switch on or switch off the second conductive path 206, a second power supply 302 functioned as an auxiliary power, and a switching element 303 which switches a power supply for driving the load 203.

The switching element 303 has a first switching element 304 for connecting or disconnecting the fuel cell 301 with the load 203, and a second switching element 305 for connecting or disconnecting the second power supply 302 with the load 203.

In the aspect of normal power generation running, when the switching element 300 is switched off, the first switching element 304 is switched on, and at the same time, the second switching element 305 is switched off. Therefore, the load 203 and the fuel cell 301 are in electrical connection, and the load 203 and the second power supply 302 are in disconnection. As a result, the load 203 is driven by the power generation of the fuel cell 301. The second power supply 302 can use the commercial power supply as direct current, or use the second fuel cell.

In addition, when the power generating performance of the fuel cell 301 is degraded, the activation aspect of the above-mentioned activation treatment is carried out on the fuel cell 301. When the activation treatment mode is carried out on the fuel cell 301, the second switching element 305 is switched on, and at the same time, the first switching element 304 is switched off. Therefore, the load 203 and the fuel cell 301 are in disconnection, and at the same time, the load 203 and the second power supply 302 are in electrical connection. Due to this, the load 203 is driven by the second power supply 302, not by the fuel cell 301. In the activation treatment as above-mentioned, the switching element 300 is switched on, and the activation treatment in Examples 1-3 is carried out, and the cell voltage output of the fuel cell 301 is restored. When the cell voltage output is restored, the switching element 300 and the second switching element 305 are switched off again, and the first switching element 304 is switched on, to change to the mode of the normal generation running. The present invention is not limited to the Examples and applicable Example as above-mentioned and shown in Figures, and it can be carried out by making appropriate modifications within the range of not deviating from the main points.

POSSIBILITY OF INDUSTRIAL APPLICATION

A polymer electrolyte fuel cell in the present invention can be used extensively to a fuel cell power generation system for vehicles, emplacement, electrical equipment, electronic equipment and so on.

The invention claimed is:

1. An activation method for preparing a polymer electrolyte fuel cell before the fuel cell generates electricity including a membrane electrode assembly that includes an electrolyte membrane formed by a polymer electrolyte membrane, and an anode and a cathode each carrying a respective catalytic metal and sandwiching said electrolyte membrane, wherein
    said anode and said cathode are in electrical connection; and
    an activation treatment opens an active site of said catalytic metal of said cathode by supplying gas containing hydrogen to said anode, supplying gas containing oxygen to said cathode, and setting said cathode in an oxygen shortage condition in which an oxygen utilization rate is over 100%,
    wherein the oxygen utilization rate corresponds to a ratio of an oxygen amount actually utilized in power generation to an amount of oxygen supplied to the polymer electrolyte fuel cell.

2. The activation method according to claim 1, wherein said activation treatment is carried out by supplying electrons forcibly to said cathode from an external environment.

3. The activation method according to claim 2, wherein said external environment is a battery.

4. The activation method according to claim 1, wherein said activation treatment is carried out for maintaining potential of said cathode at 0.5v or less.

5. The activation method according to claim 1, wherein
a second conductive path whose electric resistance is relatively lower than that of a first conductive path in normal operation for generation of electricity, and
said activation treatment is carried out in the condition that said anode and said cathode are in electrical connection by way of said second conductive path.

6. The activation method according to claim 1, wherein the oxygen utilization rate is set to 200% during the activation treatment.

7. The activation method according to claim 6, further comprising:
a normal power generation running mode that includes an oxygen utilization rate of 40%.

* * * * *